Patented Sept. 8, 1953

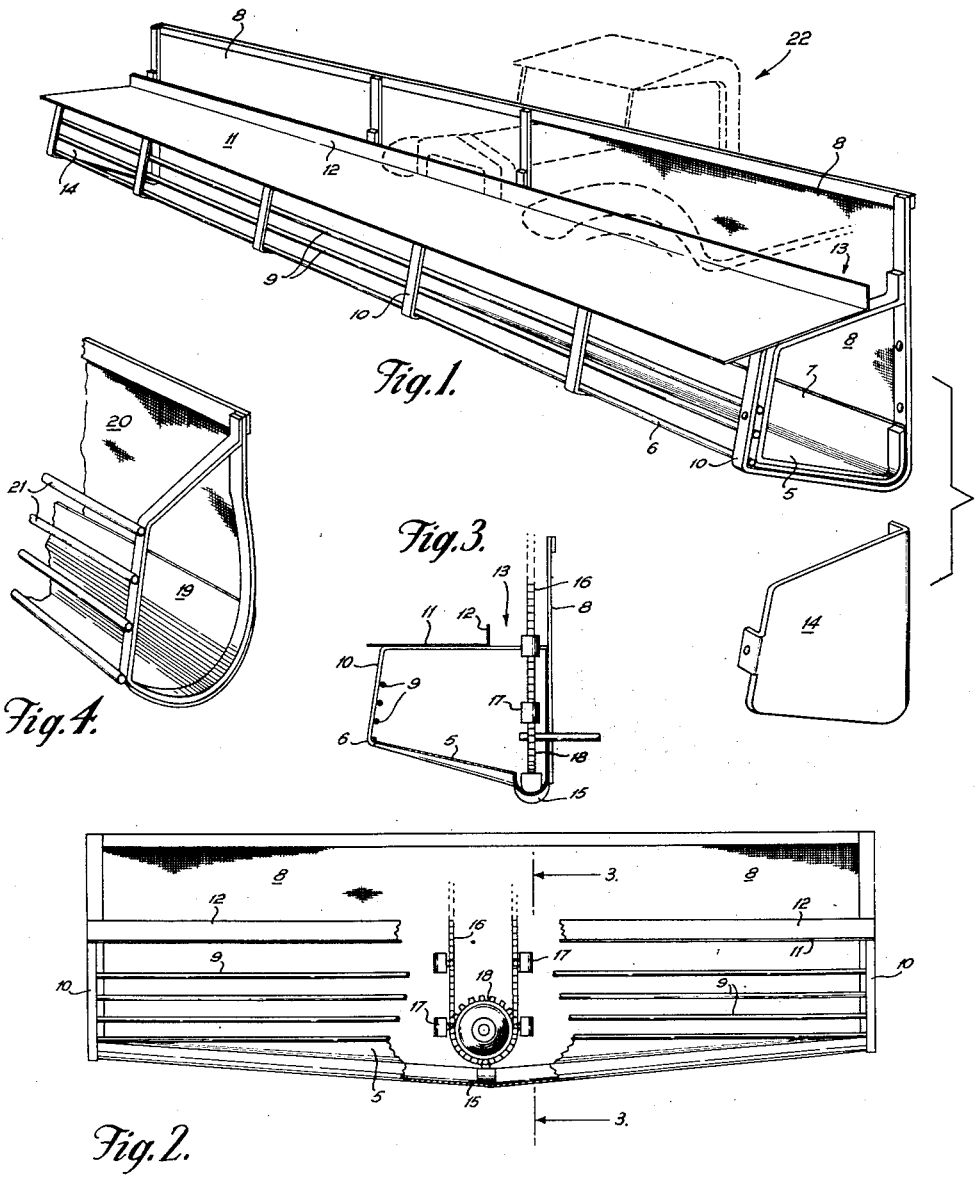

2,651,164

UNITED STATES PATENT OFFICE 2,651,164

SEED GATHERER

Frederick King Fleming, Willow Creek, Trunkey, New South Wales, Australia

Application January 13, 1949, Serial No. 70,695
In Australia February 16, 1948

5 Claims. (Cl. 56—126)

This invention relates to harvesting of cereal crops of the type in which the grain or seed is carried in an ear (or head) supported by an upstanding stem. It is particularly applicable to the harvesting of the seed of the grass *Phalaris tuberosa*, in which connection it is hereinafter described, but may be applied to the harvesting of other cereals on which its peculiar harvesting action is effective.

The object of the invention is to provide a harvester for the grass seed which is primarily simple and hence inexpensive of construction, and can therefore be constructed and employed by a wide range of users. This object is coupled with the provision of a harvester which is efficient in operation so that a high percentage of the available seed is garnered, and moreover one which can be used in the simplest of manners, i. e. by merely driving the harvester through the grass when in seed.

In the case of the seed of *Phalaris tuberosa*, it is most important that only the ripe seed be garnered, as the unripe seed is useless and cannot be economically separated from the ripe seed if garnered therewith. Thus the conventional harvesters as used for grain crops and which strip the whole ear, are not satisfactory for seed of this type.

The harvester according to the present invention has the particular merit that it will strip from the seed ear substantially only the ripe seed, which is freely separated from the ear. The unripe seed adheres reasonably tenaciously to the ear, and is not stripped, but remains for stripping later when ripe.

In order to fully ascertain the invention, preferred forms thereof are now described with reference to the accompanying drawings, in which Fig. 1 is a perspective view of one form of the harvester with one end plate removed, shown in relation to a motor vehicle on which it is mounted for use, Fig. 2 is a front elevational view, with parts broken away, of a modified form of the trough shown in Fig. 1, said trough having a seed elevator therein, Fig. 3 is a sectional view of the trough and elevator, taken on line 3—3 of Fig. 2, and Fig. 4 is a fragmentary perspective view of a modified and simplified form of the harvester.

The harvester illustrated in Fig. 1 comprises an elongated trough 5 of sheet metal which extends downwardly from its front edge 6 towards the rear, where it is upswept in a narrow flange 7. The rear wall of the harvester is formed by a fine mesh screen 8 extending vertically from flange 7.

Along the front of the harvester is arranged a grid formed by spaced horizontal stripping bars 9, 9 mounted on brackets 10, 10 secured to the trough and returned horizontally at their upper side for fastening to the screen 8. The plane in which the bars 9, 9 lie is inclined rearwardly slightly from the vertical.

The trough is fitted with a horizontal cover plate 11, formed with narrow upturned flange 12 along its rear edge, and spaced from the rear screen 8 to form an air escape slot 13. The ends of the trough are closed by plates 14, 14 one of which is shown detached (for clarity) in Fig. 1.

Figs. 2 and 3 illustrate that the bottom of trough 5 is sloped from either end to a central low point 15, for co-operation with a vertical conveyor for the seed. Such conveyor, which is illustrated diagrammatically, is of simple type comprising an endless chain 16 fitted with cups 17, 17 and reeved about a lower sprocket 18 to bring the cups into the lowest point 15 of the trough.

The form of harvester illustrated in Fig. 4 is of simple type comprising a curved trough 19 extending into a screen 20 and fitted along its front with stripping bars 21. No top or end closures, or conveyor means are provided.

In any form, the harvester is mounted transversely across the front of a motor vehicle 22, as shown diagrammatically in Fig. 1, with the trough clear of the ground and the grid of stripping bars preferably extending from slightly below the lowest level to slightly above the highest level from which it is desired to strip the ears.

In use, the harvester is driven through the crop, and the standing ears are threshed against the stripping bars in an action which "flips" the ears and deposits the loose (ripe) seed therefrom into the trough, as each stem is hit by one of the stripping bars or the front edge of the trough, the seed head is laid back over the bar or the edge of the trough, the forward motion of the harvester then whips the stem and seed head forward leaving the seed, which is very free when ripe, to fall into the trough or hit the back screen and then fall into the trough. The air flow passes through the back screen, which prevents the passage of the seed, and/or in the construction shown in Fig. 1, through the space 13 between the cover plate 11 and screen 8.

After sufficient running, the seed is removed from the trough by hand, or in the case of the conveyor illustrated in Figs. 2 and 3, it is continuously removed. The unripe seed in the main is retained in the ear, and may be garnered when ripe by the same simple means of progressing the harvester through the crop once more.

The number of stripping bars used will be determined by the desirability of covering the full depth range of the standing ears, and by the necessity for leaving just sufficient space between bars to admit between them an ear in the vertical position. In the simplest form, but one bar, for instance that formed by the leading edge of the trough itself, may be used.

The invention provides a simple, cheap and efficient harvester for phalaris seed, and for other cereal crops to which it is suited.

I claim:

1. A harvester for the purpose set forth, comprising a horizontally disposed trough the floor of which slopes from its ends to a "low point" at about the middle of the trough for the accumulation of seed, a conveyor to lift seed from the low point, a grid formed of horizontal stripping bars spaced apart at a distance at least as great but not greatly exceeding the maximum normal height of an ear of the cereal crop intended to be harvested by the harvester, said grid being attached to and extending upwardly from the front edge of the trough substantially in the vertical plane, and including a screen extending upwardly from the rear of the trough.

2. A harvester for the purpose set forth comprising a downwardly inclined trough disposed in a substantially horizontal plane, grain stripping means carried at one edge of said trough and extending in a substantially vertical plane therefrom and adapted to receive an ear of cereal to be harvested, and a retaining screen carried by the opposite edge of the trough and extending upwardly in a substantially vertical plane with respect thereto.

3. A harvester for the purpose set forth comprising a downwardly inclined trough disposed in a substantially horizontal plane, a grid carried at one edge of said trough and perpendicular thereto, said grid formed of spaced apart vertical stripping bars adapted to receive an ear of cereal to be harvested, and a retaining screen carried by the opposite edge of said trough and extending upwardly in a vertical plane with respect thereto.

4. A harvester for the purpose set forth comprising a trough disposed in a substantially horizontal plane and inclined downwardly and rearwardly from its leading edge, a grid carried by said leading edge and extending vertically therefrom, said grid formed of spaced apart stripping bars adapted to receive therebetween an ear of cereal to be harvested, and a retaining screen carried by the opposite edge of said trough and extending upwardly in a vertical plane with respect to said trough.

5. A harvester for the purpose set forth comprising a downwardly inclined trough disposed in a substantially horizontal plane with its center portion being lower than its extremities, grain stripping means carried at one edge of said trough and extending in a substantially vertical plane therefrom, said last-named means comprising a grid formed of horizontal stripping bars adapted to strike and receive therebetween an ear of cereal to be harvested, and a retaining screen carried by the opposite edge of said trough and extending upwardly in a substantially vertical plane with respect thereto.

FREDERICK KING FLEMING.

References Cited in the file of this patent

UNITED STATES PATENTS

| Number | Name | Date |
|---|---|---|
| 97,932 | King et al. | Dec. 14, 1869 |
| 502,534 | Scott | Aug. 1, 1893 |
| 691,762 | Haertl | Jan. 28, 1902 |
| 693,279 | Lamoreux | Feb. 11, 1902 |
| 1,138,952 | Hewitt | May 11, 1915 |
| 1,629,215 | Johnson | May 17, 1927 |
| 1,843,190 | Bailor | Feb. 2, 1932 |
| 1,975,572 | Guyle | Oct. 2, 1934 |
| 2,374,150 | Williams | Apr. 17, 1945 |
| 2,460,029 | Ramp | Jan. 25, 1949 |

FOREIGN PATENTS

| Number | Country | Date |
|---|---|---|
| 10,090 | France | Oct. 2, 1844 |